United States Patent Office 2,698,805
Patented Jan. 4, 1955

2,698,805

POLISHING COMPOSITION

Chester C. Currie and Charles W. Todd, Midland, Mich., assignors to Dow Corning Corporation, Midland, Mich., a corporation of Michigan No Drawing. Application September 29, 1950, Serial No. 187,684

2 Claims. (Cl. 106—8)

This invention relates to polish and its method of preparation. It is particularly concerned with polishes suitable for use on finished wood, leather, plastic, and metallic surfaces.

Furniture polishes heretofore in use have organic oils and waxes as the glossing agent. Although these materials produce good surface appearance they suffer from certain inherent disadvantages. Polishes based on oils and the softer waxes are easily applied but tend to smear, show fingerprints, and dust adheres to surfaces so polished. Polishes based on hard waxes have less of these tendencies but are difficult to apply, requiring considerably more effort to polish to a high luster than do the soft waxes.

It is an object of this invention to provide an improved polish which may be applied with a minimum of effort. Other objects are to provide a polish which does not smear and does not show fingerprints, and to which dust does not readily adhere.

This invention concerns an emulsion polish comprising from 2 to 15 per cent by weight of a hydrocarbon soluble organopolysiloxane having from 1 to 3 aryl, alkyl, or aralkyl radicals per silicon atom, from 10 to 45 per cent by weight of a hydrocarbon solvent boiling between 50° C. and 300° C., from 0.5 to 3 per cent by weight of an aluminum stearate of the group consisting of aluminum monostearate and aluminum distearate, and from 37 to 87.5 per cent by weight water.

The polishes of this invention are water and oil emulsions varying in consistency from that of a heavy cream to that of a paste. The polish undergoes no significant phase separation upon standing. The use of the aluminum stearates herein has given a product which it has not been found possible to duplicate with other metal organic salts.

A preferred method of preparing the emulsion is that of mixing the siloxane, solvent, and the aluminum stearate, and heating the mixture until it is homogeneous. This mixture is rapidly agitated at the elevated temperature while heated water is added thereto. The resulting emulsion is agitated until a uniform product is obtained. The precise method of producing the emulsion is not critical although it has been found that the use of a colloid mill or a high speed mixer such as an Eppenbach mixer offers a convenient method.

The polysiloxanes employed in this invention are those in which the organic groups are hydrocarbon radicals attached to the silicon through carbon-silicon linkages. The siloxanes have from 1 to 3 organic radicals per silicon atom. These radicals are alkyl such as methyl, ethyl, propyl, and octadecyl; monocyclic aryl such as phenyl, tolyl, and chlorophenyl; dicyclicaryl such as xenyl; and aralkyl such as benzyl. These siloxanes may vary from low viscosity liquids to solids. The only critical feature is that the siloxane be soluble in the defined hydrocarbon solvents. Such siloxanes are well known commercially available materials.

The preferred solvents are petroleum and coal tar hydrocarbons boiling between 50° C. and 300° C. Preferred solvents are those which are relatively non-toxic and which have comparatively high flash points. It is of course also preferred that the solvents not have a softening effect upon varnished or lacquered surfaces. Particularly preferred are the aliphatic and alicyclic hydrocarbons such as the petroleum naphthas and mineral spirits, as for example naphthol mineral spirits, Stoddard solvent, and kerosene.

If desired, the well known synthetic, vegetable, mineral, insect, and animal organic polishing waxes may be incorporated in the polish of this invention. Such waxes include bees wax, carnauba wax, paraffin, ceresine wax, candelilla wax, esparto wax, montan wax, and the like. The amount of such waxes, however, should be held to a minimum to avoid the inherent disadvantages of the prior art polishes. If used in the polish, therefore, it is preferable that they not constitute more than 10 per cent by weight of the total composition.

Other well known additives, such as perfumes, dyes, and anti-slip compounds, may be added to the polish of this invention if desired.

Compounds such as aluminum borate, and aluminum sulfate, in amounts preferably less than 2 per cent by weight, may also be added to the polishes of this invention. Such additives tend to improve the ease with which smooth homogeneous emulsions are obtained. They are not needed if good mixing equipment is available, but may be used to advantage if less efficient mixers are used.

The polishes herewith may be applied to finished surfaces with a minimum of rubbing. A relatively permanent finish is obtained thereby, providing both a high gloss and surface protection. The polished surface does not smear and does not show fingerprints, and dust particles are relatively nonadherent thereto. Due to the presence of both water and hydrocarbon solvent in the polish, excellent cleaning properties are obtained for a wide variety of surface stains.

The polish is of major utility as a furniture polish. It is also useful, however, in polishing shoes, boots, and the like. In this latter case the footwear is not only polished but also is rendered water repellent.

The following examples are illustrative only. Parts given are parts by weight.

Example 1

The following materials were mixed:

| Parts | Percent by weight | Materials |
|---|---|---|
| 50 | 25 | Naphthol mineral spirits. |
| 3 | 1.5 | Aluminum distearate. |
| 8 | 4 | Dimethylsiloxane fluid. |

These materials were agitated and heated to 80° C. 139 parts of water (69.5 per cent by weight) were then heated to 70° C. and added with rapid agitation to the above mixture. The resulting emulsion was poured into containers and allowed to cool. A very satisfactory paste type furniture polish was obtained. The naphthol mineral spirits used in the above mixture was a petroleum naphtha having a boiling range of 148° to 163° C. The dimethyl siloxane fluid used had a viscosity of 350 centistokes at 25° C.

Example 2

A mixture of 8 parts of a dimethylsiloxane-benzylmethylsiloxane copolymeric fluid (1,000 centistokes viscosity), 19 parts naphthol mineral spirits, and 1 part of aluminum distearate was heated to 80° C. The mixture was rapidly agitated while 72 parts of water at 70° C. was added. A satisfactory paste type polish was obtained.

Example 3

A mixture of 8 parts butylmethylsiloxane fluid, 1 part aluminum distearate, and 20 parts naphthol mineral spirits was heated to 100° C. The mixture was rapidly agitated and 71 parts of water at 85° C. were slowly added. The resulting emulsion upon cooling was a satisfactory furniture polish.

Example 4

A mixture was prepared of 8 parts trimethylsiloxy endblocked dimethylsiloxane fluid (100 centistokes viscosity), 17 parts white gas and 1.5 parts aluminum distearate. This mixture was heated to 55° C. and rapidly agitated while 73.5 parts of water at 70° C. was added thereto.

The resulting emulsion was cooled, giving a satisfactory polish.

Example 5

A mixture was prepared of 4 parts dimethylpolysiloxane fluid (12,000 centistokes viscosity), 45 parts naphthol mineral spirits, 3 parts aluminum distearate, and 1 part of aluminum borate.

The mixture was heated to 80° C. and rapidly agitated while 47 parts of water at 70° C. was aded. The resulting emulsion was cooled, producing a satisfactory paste type furniture polish.

Example 6

A mixture was prepared of 4.3 parts dimethylpolysiloxane fluid (350 centistokes viscosity), 35.7 parts naphthol mineral spirits, 1.5 parts aluminum distearate, 0.5 part carnauba wax (No. 1, light yellow), 0.5 part microcrystalline wax, and 0.5 part paraffin wax (melting point 170° to 175° F.). The mixture was heated to 80° C. and rapidly agitated while 57 parts of water at 70° C. were added. The resulting emulsion was cooled, giving a satisfactory paste type furniture polish.

Example 7

A mixture was prepared of 4 parts dimethylsiloxane fluid (350 centistokes viscosity), 1.5 parts aluminum monostearate, and 25 parts naphthol mineral spirits. The mixture was heated to 80° C. and rapidly agitated while 69.5 parts of water at 70° C. were added. The resulting emulsion cooled to a satisfactory paste polish.

Example 8

A mixture was prepared of 15 parts naphthol mineral spirits, 1.5 parts aluminum distearate, 0.5 part aluminum borate, and 2 parts of trimethylsiloxy end-blocked phenylmethylpolysiloxane fluid (500 centistokes viscosity). As before, the mixture was heated to 80° C. and agitated during the addition of 81 parts of water at 70° C. Upon cooling a satisfactory paste type furniture polish was obtained.

Example 9

A polish was prepared using the ingredients and procedure of Example 1 except that 4 parts by weight of octadecyl silsesquioxane was employed as the siloxane.

Example 10

Satisfactory polishes were prepared using the ingredients and procedure of Example 1 except that white gas, kerosene, and Stoddard solvent were used respectively as the solvents.

Example 11

A mixture of 6 parts of a fluid copolymer of monomethyl-, dimethyl-, and trimethyl siloxanes (350 centistokes viscosity), 20 parts Stoddard solvent, 1.5 parts aluminum distearate, 0.5 part aluminum borate, and 14 parts of a powdered trimethylsilyl substituted silica was heated to 80° C. Water at 70° C. was added thereto with rapid agitation. The resulting emulsion was cooled, giving a smooth paste-like product which was found to be an excellent leather preservative and polish.

The trimethylsilyl substituted silica used above was prepared by reacting $(CH_3)_3SiCl$ with a silica organogel in the manner described in the copending application of Leslie J. Tyler, Serial No. 160,099, filed May 4, 1950, and assigned to the assignee of this invention.

The emulsions prepared in Examples 1 to 11 all performed satisfactorily as furniture polishes. They were easy to apply, gave a high luster finish, and had no tendency to smear.

That which is claimed is:

1. An emulsion furniture polish consisting essentially of from 2 to 15 per cent by weight of a hydrocarbon-soluble organopolysiloxane having from 1 to 3 hydrocarbon radicals per silicon atom, said radicals being selected from the group consisting of alkyl, aryl, and aralkyl radicals, from 10 to 45 per cent by weight of a hydrocarbon solvent selected from the group consisting of aliphatic and alicyclic hydrocarbons, boiling between 50° C. and 300° C., from 0.5 to 3 per cent by weight of an aluminum stearate selected from the group consisting of aluminum monostearate and aluminum distearate, from 37 to 87.5 per cent by weight water, and less than 2 per cent of an aluminum compound selected from the group consisting of aluminum borate and aluminum sulfate.

2. An emulsion furniture polish consisting essentially of from 2 to 15 per cent by weight of a hydrocarbon-soluble organopolysiloxane having from 1 to 3 hydrocarbon radicals per silicon atom, said radicals being selected from the group consisting of alkyl, aryl, and aralkyl radicals, from 10 to 45 per cent by weight of a hydrocarbon solvent selected from the group consisting of aliphatic and alicyclic hydrocarbons boiling between 50° C. and 300° C., from 0.5 to 3 per cent by weight of an aluminum stearate selected from the group consisting of aluminum monostearate and aluminum distearate, from 0.5 to 10 per cent by weight of an organic polishing wax, from 37 to 87.5 per cent by weight water, and less than 2 per cent of an aluminum compound selected from the group consisting of aluminum borate and aluminum sulfate.

References Cited in the file of this patent

UNITED STATES PATENTS

| Number | Name | Date |
|---|---|---|
| 2,406,671 | Diamond | Aug. 27, 1946 |
| 2,482,888 | Walsh | Sept. 27, 1949 |
| 2,523,281 | Currie | Sept. 26, 1950 |
| 2,584,413 | Baer | Feb. 5, 1952 |
| 2,599,984 | Fletcher et al. | June 10, 1952 |
| 2,606,153 | Holdstock | Aug. 5, 1952 |
| 2,614,049 | Swanson | Oct. 14, 1952 |
| 2,626,870 | Cooke et al. | Jan. 27, 1953 |

OTHER REFERENCES

"The Chemistry and Technology of Waxes," Warth-Reinhold Pub. Co., N. Y., 1947, pages 317, 318, 319.

"Commercial Waxes," Bennett, Chem. Pub. Co., Inc., 1944, Brooklyn, New York, page 490.